(12) United States Patent
Pigott

(10) Patent No.: US 8,436,582 B2
(45) Date of Patent: May 7, 2013

(54) BATTERY CELL EQUALIZER SYSTEM

(75) Inventor: John M. Pigott, Phoenix, AZ (US)

(73) Assignee: Freescale Semiconductor, Inc., Austin, TX (US)

( * ) Notice: Subject to any disclaimer, the term of this patent is extended or adjusted under 35 U.S.C. 154(b) by 384 days.

(21) Appl. No.: 12/833,430

(22) Filed: Jul. 9, 2010

(65) Prior Publication Data

US 2012/0007558 A1   Jan. 12, 2012

(51) Int. Cl.
   *H02J 7/00* (2006.01)

(52) U.S. Cl.
   USPC ........................................... 320/118; 320/119

(58) Field of Classification Search .................. 320/118, 320/119
   See application file for complete search history.

(56) References Cited

U.S. PATENT DOCUMENTS

| | | | | |
|---|---|---|---|---|
| 5,659,237 | A * | 8/1997 | Divan et al. .................... | 320/119 |
| 6,081,095 | A * | 6/2000 | Tamura et al. ................. | 320/118 |
| 7,400,114 | B2 * | 7/2008 | Anzawa et al. ............... | 320/119 |
| 2004/0113586 | A1 * | 6/2004 | Chen .............................. | 320/118 |
| 2007/0279003 | A1 * | 12/2007 | Altemose et al. ............. | 320/118 |
| 2010/0171475 | A1 * | 7/2010 | Leman et al. ................. | 323/282 |

OTHER PUBLICATIONS

Moo, C.S., et al., "Dynamic charge equalisation for series-connected batteries", IEEE Proc-Electr. Power Appl. vol. 150, No. 5, Sep. 2003, pp. 501-505.
Kutkut, N.H., "A Modular Non Dissipative Current Diverter for EV Battery Charge Equalization", IEEE, Thirteenth Annual Applied Power Electronics Conference and Exposition, 1998, pp. 686-690.
Wen, S., "Cell balancing buys extra run time and battery life", Analog Applications Journal, High-Performance Analog Products, Texas Instruments Incorporated, 1Q 2009, pp. 14-21.
Hopkins, D.C., et al., "Dynamic Equalization During Charging of Serial Energy Storage Elements" IEEE Transaction on Industry Applications, vol. 29, No. 2, Mar./Apr. 1993, pp. 363-368.
Hung, S.T., et al., "Extension of Battery Life via Charge Equalization Control", IEEE Transactions on industrial Electronics, vol. 40, No. 1, Feb. 1993, pp. 96-104.

* cited by examiner

*Primary Examiner* — M'Baye Diao
(74) *Attorney, Agent, or Firm* — James L. Clingan, Jr.; David G. Dolezal

(57) ABSTRACT

A method of operating a battery system includes a plurality of battery cells coupled in series. The plurality of cells includes at least three battery cells coupled in series. The method includes determining a cell with the greatest charge excess of the plurality of battery cells. The method further includes determining a cell with the greatest charge deficit of the plurality of battery cells. The method further includes discharging the cell with the greatest charge excess to charge, with a voltage converter, the cell with the greatest charge deficit.

16 Claims, 5 Drawing Sheets

BATTERY CELL EQUALIZER SYSTEM

BACKGROUND

1. Field

This disclosure relates generally to battery charging, and more specifically, to battery chargers that equalize charge on the battery cells.

2. Related Art

Battery charging systems are often used for batteries that have a number of cells that are connected in series. As charging occurs, each cell is charged from current that is supplied by a charger. Due to a variety of factors that may come into play during manufacturing and use, it may turn out that the cells are not all charged at the same rate to the desired level, especially as the battery ages. In such case some cells are charged to a greater level than others which has the potentially harmful effect of overcharging some cells. There is then the issue of the degree of overcharging that may be harmful versus the problem of one or more cells not reaching the desired level. Thus, there is a continuing preference to avoid overcharging any cells while still obtaining the desired level of charge for any of the cells.

Accordingly, there is a need for improved charging that reduces problems with overcharging while efficiently obtaining the desired level of charge of all of the cells such as transferring energy efficiently from cell to another cell in the battery pack using a DC to DC converter.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

In one aspect, a battery charging system includes a plurality of cells and a corresponding converter stage for each cell. During charging, a pair of converter stages are configured to take charge from a cell that highest charge excess to the cell that has the greatest charge deficit. The converter stage for the cell with the greatest charge excess is placed in a source configuration and the converter stage for the cell having the greatest charge deficit is placed in a sink configuration. This reduces the effect of overcharging while also providing increased charge to the cell with the greatest charge deficit. The particular cells with the greatest charged deficits and excesses may change during the charging process. Accordingly, the pair of cells selected for reduced and increased charging may change during the charging process. This is better understood by reference to the drawings and the following description.

Figure 1:
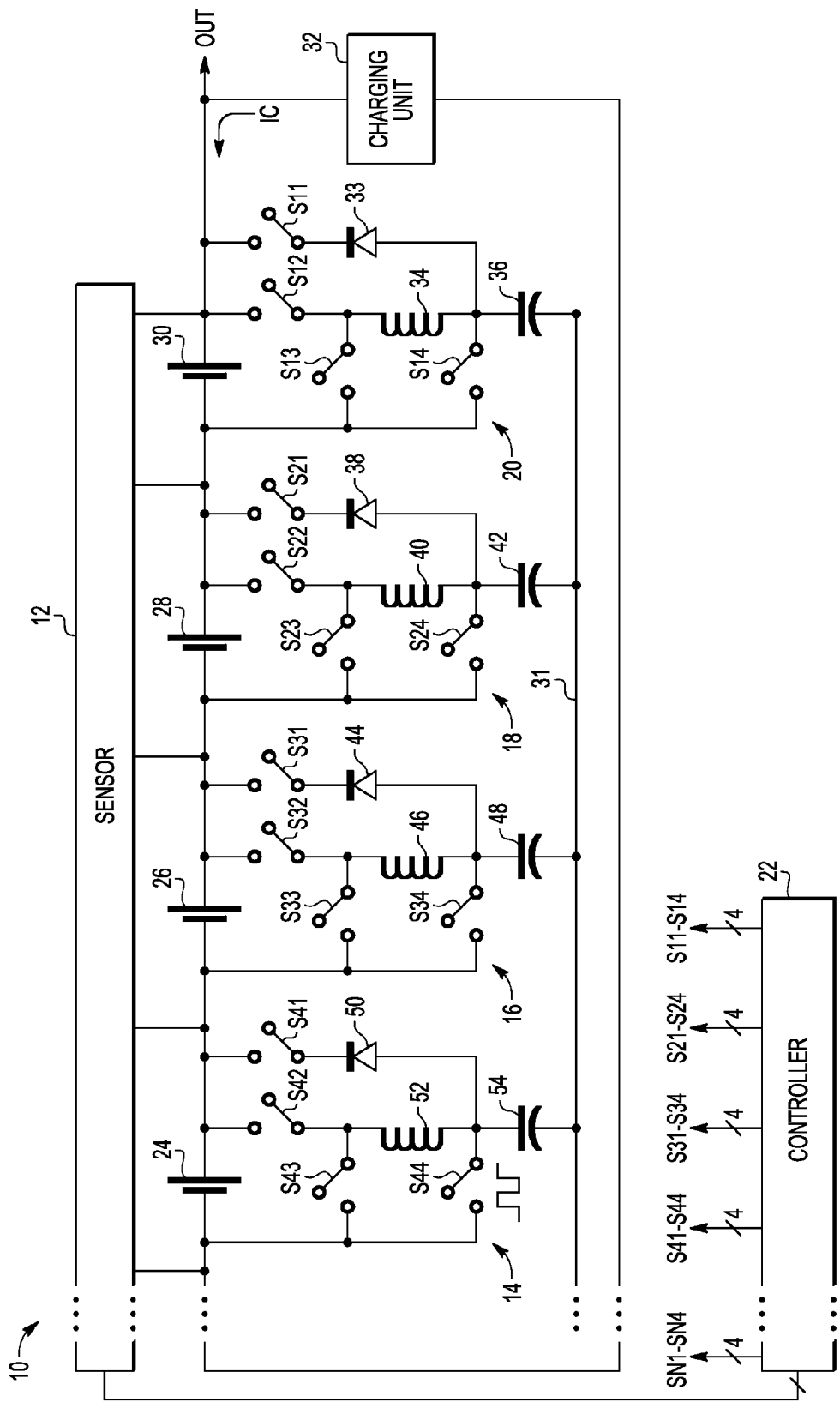
FIG. 1 is a combination block diagram and circuit diagram of a battery charging system.

Shown in FIG. 1 a charging system 10 comprising a sensor 12, a converter stage 14, a converter stage 16, a converter stage 18, a converter stage 20, a controller 22, a cell 24, a cell 26, a cell 28, a cell 30, a bus 31, and a charging unit 32. Converter stage 14 comprises a switch S41, a switch S42, a switch S43, a switch S44, a diode 50, an inductor 52, and a capacitor 54. Converter stage 16 comprises a switch S31, a switch S32, a switch S33, a switch S34, a diode 44, an inductor 46, and a capacitor 48. Converter stage 18 comprises a switch S21, a switch S22, a switch S23, a switch S24, a diode 38, an inductor 40, and a capacitor 42. Converter stage 20 comprises a switch S11, a switch S12, a switch S13, a switch S14, a diode 33, an inductor 34, and a capacitor 36. Cells 24, 26, 28, and 30 (24-30) are four cells connected in series that are part of a larger battery. Each cell is a energy storage unit that can be recharged. Each cell could be made up of subcells. Each of converter stages 14, 16, 18, and 20 (14-20) are configurable into one of three configurations; source configuration, sink configuration, and non-sink, non-source (passive) configuration. In the sink configuration, the converter stage provides charging current to the cell to which it corresponds. In the source configuration, the converter stage takes current from the cell to which it corresponds and provides that current to the converter stage that is in the sink configuration. A converter stage in the passive configuration neither sources current nor sinks current.

Cell 24 has a negative terminal connected to a positive terminal of a cell not shown and a positive terminal. Cell 26 has a negative terminal connected to the positive terminal of cell 24 and a positive terminal. Cell 28 has a negative terminal connected to the positive terminal of cell 26 and a positive terminal. Cell 30 has a negative terminal connected to the positive terminal of cell 28 and a positive terminal providing an output OUT. Charging unit 32 has a first terminal connected to out and a second terminal connected to the negative terminal of the last cell (not shown). Sensor 12 has a first input coupled to the negative terminal of cell 24, a second input connected to a node connected to the negative terminal of cell 26 and the positive terminal of cell 24, a third input connected to node connected to the negative terminal of cell 28 and the positive terminal of cell 26, a fourth input connected to a node connected to the negative terminal of cell 30 and the positive terminal of cell 28, a fifth input connected to the positive terminal of cell 30, and an output connected to an input of controller 22. Controller 22 has a set of outputs for each converter unit that sets the configuration for the converter units by controlling the switches of each converter unit. Converter unit 14 receives a set of outputs for controlling switches S41, S42, S43, and S44. Converter unit 16 receives a set of outputs for controlling switches S31, S32, S33, and S34. Converter unit 18 receives a set of outputs for controlling switches S21, S22, S23, and S24. Converter unit 20 receives a set of outputs for controlling switches S11, S12, S13, and S14.

Concerning the connections of converter units 14-20, switch S41 has a first terminal connected to the positive terminal of cell 24 and a second terminal connected to an anode of diode 50. Switch S42 has a first terminal connected to the positive terminal of cell 24 and a second terminal. Switch 43 has a first terminal connected to the negative terminal of cell 24 and a second terminal connected to a first terminal of inductor 52. Switch S44 has a first terminal connected to the negative terminal of cell 24 and a second terminal connected to a second terminal of inductor 52 and a cathode of diode 50. Capacitor 54 has a first terminal connected to the second terminal of inductor 52 and a second terminal connected to bus 31. Switch S31 has a first terminal connected to the positive terminal of cell 26 and a second terminal connected to an anode of diode 44. Switch S32 has a first terminal connected to the positive terminal of cell 26 and a second terminal. Switch S33 has a first terminal connected to the negative terminal of cell 26 and a second terminal connected to a first terminal of inductor 46. Switch S34 has a first terminal connected to the negative terminal of cell 26 and a second terminal connected to a second terminal of inductor 46 and a cathode of diode 44. Capacitor 48 has a first terminal connected to the second terminal of inductor 46 and a second terminal connected to bus 31. Switch S21 has a first terminal connected to the positive terminal of cell 28 and a second terminal connected to an anode of diode 38. Switch S22 has a first terminal connected to the positive terminal of cell 28 and a second terminal. Switch S23 has a first terminal connected to the negative terminal of cell 28 and a second terminal connected to a first terminal of inductor 40. Switch S24 has a first terminal connected to the negative terminal cell 28 and a second terminal connected to a second terminal of inductor 40 and a cathode of diode 38. Capacitor 42 has a first terminal connected to the second terminal of inductor 40 and a second terminal connected to bus 31. Switch S11 has a first terminal connected to the positive terminal of cell 30 and a second terminal connected to an anode of diode 33. Switch S12 has a first terminal connected to the positive terminal of cell 30 and a second terminal. Switch S13 has a first terminal connected to the negative terminal of cell 30 and a second terminal connected to a first terminal of inductor 34. Switch 14 has a first terminal connected to the negative terminal cell 30 and a second terminal connected to a second terminal of inductor 34 and a cathode of diode 32. Capacitor 36 has a first terminal connected to the second terminal of inductor 34 and a second terminal connected to bus 31.

In operation, system 10 charges cells 24-30 via charging unit 32. Charging current flows from the positive terminal through the cell to the negative terminal of cells 24-30. As the cells are charged, sensor 12 senses the individual cell voltages or possibly other characteristics and provides that information to controller 22. Controller 22 responds by configuring the converter unit that corresponds to the cell with the highest voltage or highest state of charge to the source configuration and the converter unit that corresponds to the cell with the lowest voltage or lowest state of charge to the sink configuration. The other converter units are held in the passive configuration. While usually the cell chosen to be used as the source or sink has the absolute highest or lowest value respectively, the selection may be based on other criteria such as expected degradation or expected different loading. The effect of this balancing process is to reduce the net current charging the cell which is sourcing balancing power and to increase the net current charging the cell which is sinking power. Sensor 12 continues to monitor the voltage of the cells and couple that information to controller 22. Periodically or at such time as a different cell becomes the highest or lowest voltage, the corresponding converter unit is switched to the appropriate configuration and the cell that is no longer the highest or lowest has its converter unit switched to the passive configuration. This process of identifying the cell with the highest and lowest voltage and responding with the proper configuration for the corresponding converter units continues. At some point the charging unit will eventually stop providing current. Controller 22 may continue with the process even after charging unit 32 has stopped providing current in order to achieve an equal SoC for all of the cells. Furthermore, controller 22 may continue with the process while the cells are providing current to a load (not shown). As an alternative, the balancing process may be discontinued upon the termination of the charging from charging unit 32. During the balancing process, all of the converter units are placed in the passive configuration if the cells are all satisfactorily balanced. As shown in FIG. 1, all of converter units 24-30 are in the passive configuration which is the configuration in which all four switches are open. If only one cell is different, then any one of the other cells of equal voltage may be selected as the other converter unit of the pair. One convention for selecting the pair is to choose the one closest to the different one on the negative terminal. Other conventions may also be used.

Figure 2:
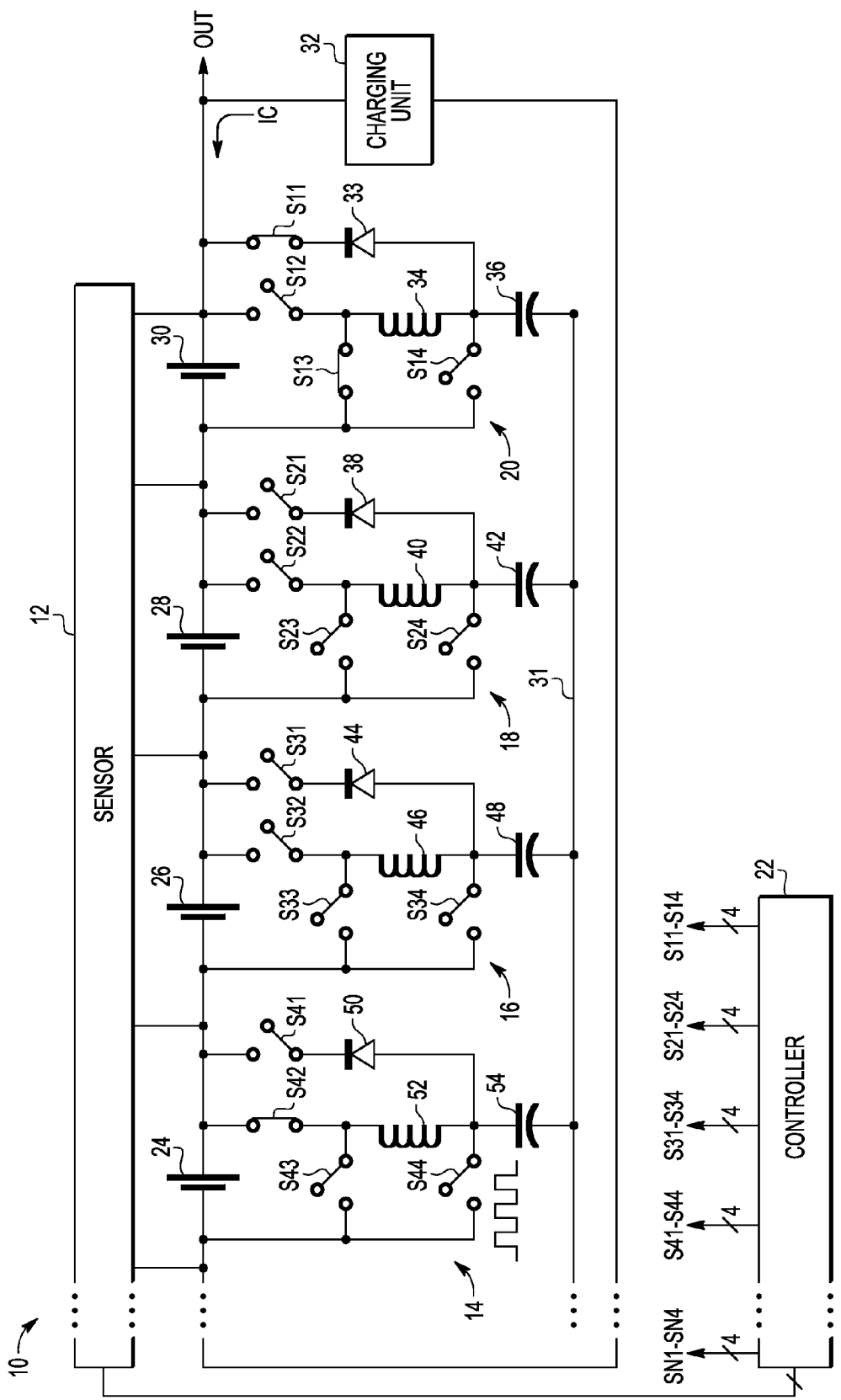
FIG. 2 is the system of FIG. 1 in a particular configuration.

Shown in FIG. 2 is system 10 configured for the case where cell 24 is the sourcing cell and cell 30 is the sinking cell. Converter unit 14 is placed in the source configuration and converter unit 20 is placed in the sink configuration. The other converter units remain in the passive configuration. Converter unit 14 is placed in the source configuration by closing switch S42 and switch S44 being switched between open and closed in response to a train of pulses. Closing switch S42 has the effect of coupling the first terminal of inductor 52 to the positive terminal of cell 24. The opening and closing of switch S44 has the effect of, responsive to the train of pulses, coupling and decoupling the negative terminal of cell 24 to the second terminal of inductor 52 and the first terminal of capacitor 54. Capacitor 54 is charged and discharged in a manner that drains current from cell 24 or at least preventing some of the charging current from reaching cell 24. Converter unit 20 is placed in the sink configuration by closing switches S11 and S13. The effect of closing switch S11 is to couple the anode of diode 33 to the positive terminal of cell 30. The effect of closing switch S13 is to couple the first terminal of inductor 34 to the negative terminal of cell 30. In the sink configuration, the switching on bus 31 has the effect of causing current to flow into cell 30 from the positive terminal to the negative terminal and thus increasing the charging of cell 30.

Figure 3:
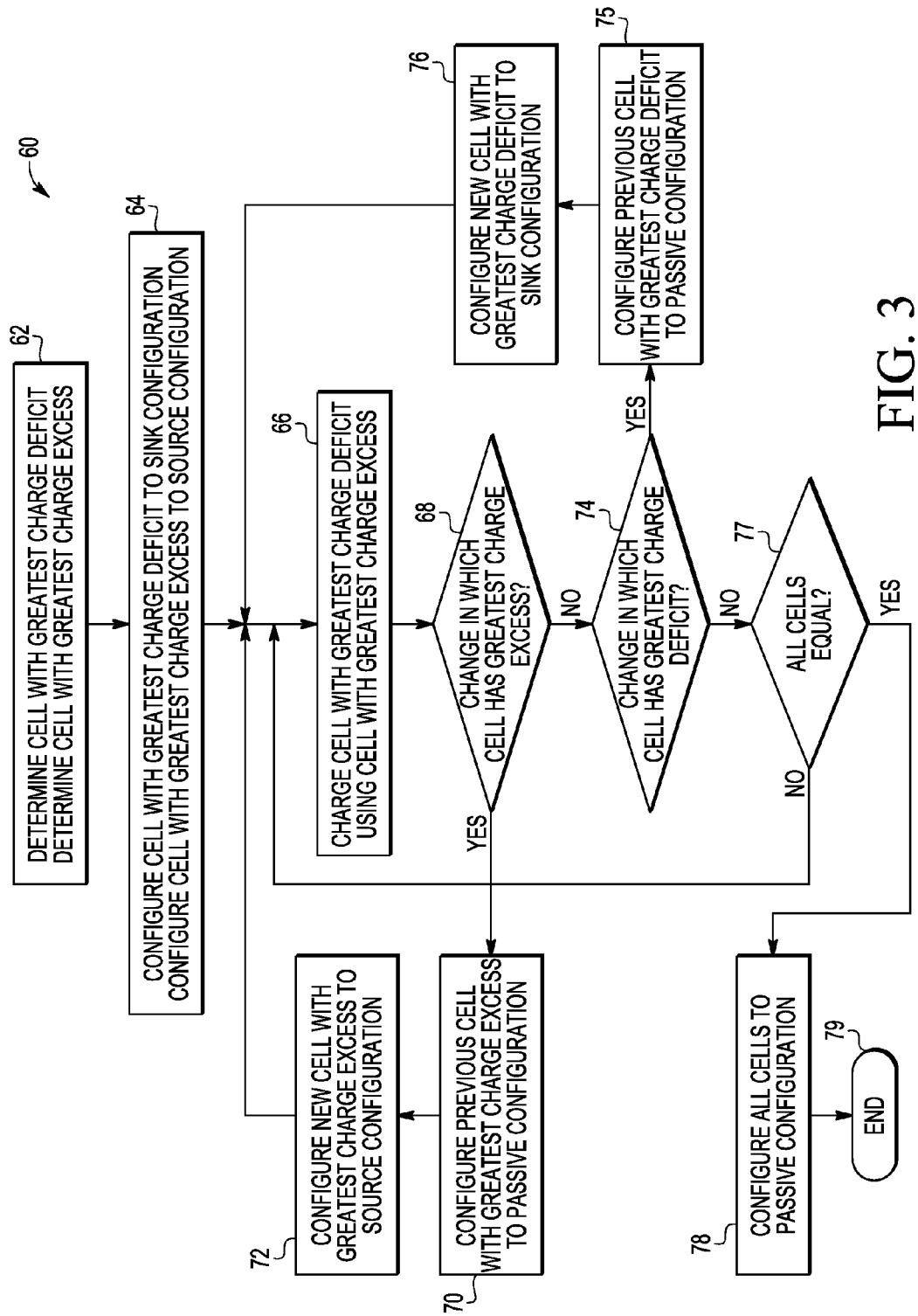
FIG. 3 is a flow diagram describing a method of operating the battery charging system of FIGS. 1 and 2.
Figure 4:
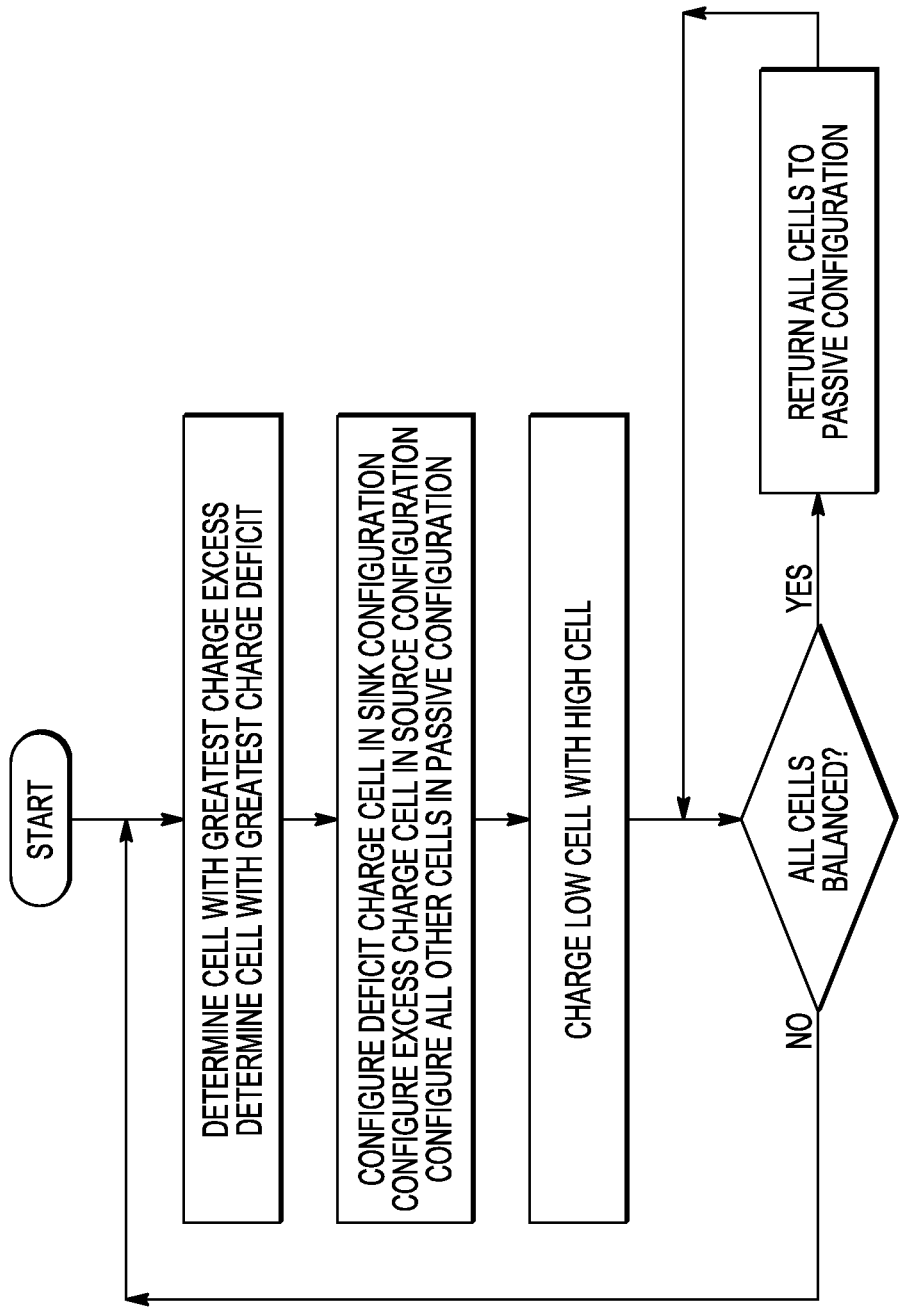
FIG. 4 is a simplified version of the flow diagram of FIG. 3.

Shown in FIG. 3 is a method 60 that shows the operation of system 10. As shown in step 62, there is a determination of the cell with greatest charge excess and the cell with the greatest charge deficit. Usually, this will correspond to the highest and lowest voltage cells or highest and lowest state of charge cells respectively, but this is not required. In step 64, the lowest charged cell has its converter unit configured in the sink configuration and the highest charged cell has its converter unit configured in the source configuration. As shown in step 66, this has the effect of charging the lowest charged cell with the highest charged cell. As shown in step 68 if there is a change in the highest charged cell, then the highest charged cell is changed to the passive configuration as shown in step 70 and the new highest charged cell is changed to the source configuration. The effect then is that the new highest charged cell charges the lowest charged cell. As shown in step 74, if there is a change in the lowest charged cell, then the converter unit of the lowest charged cell is converted to the passive configuration as shown in step 75 and the new lowest charged cell has its converter unit changed to the sink configuration. As shown in step 77, if all of the cells are at the same voltage, all of the cells have their converter units changed to the passive configuration which may be the end as shown in step 79. The cells may be continually monitored so that step 62 may begin at any during this monitoring. The monitoring is not limited to the times that charging unit 32 is charging. Method 60 may also be used when the cells are providing output current OUT. This would have the effect of improving the balance of the voltage present on each cell. Shown in FIG. 4 is a flow chart showing less detail than shown in FIG. 3 and may aid understanding of method 60.

Figure 5:
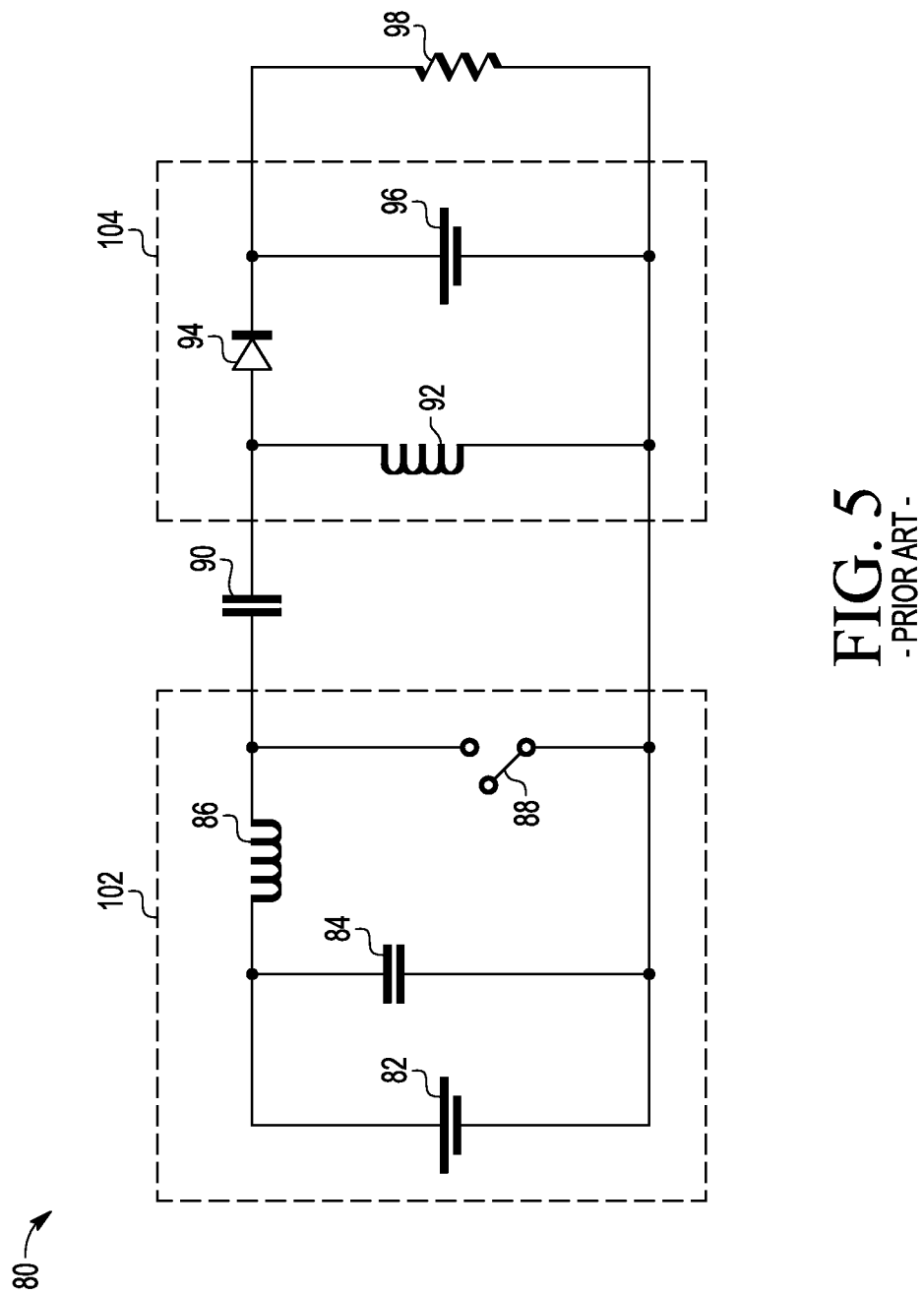
FIG. 5 is a circuit diagram of a voltage converter known in the prior art.

Shown in FIG. 5 is a single-ended primary inductor converter (SEPIC) 80 driving a load 98 comprising a voltage supply 82, a capacitor 84, an inductor 86, a switch 88, a capacitance 90, an inductor 92, a diode 94, and a capacitor 96.

Switch 88 is opened and closed responsive to a train of pulses. SEPIC 80 uses voltage supply 82 to provide a voltage across load 98 that may be greater than or less than the voltage of voltage supply 82. SEPIC 80 may be considered to have a source portion 102 and a sink portion 104 which are coupled via capacitance 90. Source portion 102 includes voltage supply 82, capacitor 84, inductor 86, and switch 88. Sink portion 104 includes inductor 92, diode 94, a capacitance 96. Sink portion 104 and source portion 102 are isolated by capacitance 90 and the voltage across load 98 can be higher, lower, or the same as the voltage of voltage supply 82. The output drive can be controlled by the duty cycle of the pulse train.

SEPIC 80 is analogous to the operation of converter unit 14 and cell 24 in combination with converter unit 20 and cell 30 as shown in FIG. 2 with converter unit 14 in the source configuration and converter unit 20 in the sink configuration. In this configuration for converter 14 in the source configuration, cell 24 is analogous to voltage supply 82 and has capacitance analogous to capacitor 84, and inductor 52 is analogous to inductor 86. The analogous elements are connected in the same way. In this configuration for converter 20, cell 30 has capacitance analogous to capacitance 96, diode 33 is analogous to diode 94, and inductor 34 is analogous to inductor 92. As for converter unit 14, the analogous elements are connected in the same way. The combination of capacitors 54 and 36, which are in series through bus 34, are analogous to capacitance 90 of SEPIC 80. Thus the combination of converter unit 14 in the source configuration and converter unit 20 in the sink mode is a SEPIC. Each converter unit can be in the sink configuration or the source configuration and when a pair of converter units have that combination of one in the source configuration and one in the sink configuration, a SEPIC is the result. A SEPIC is thus particularly advantageous for this application but other types of converters may be able to be used in this manner of providing current to a lower SoC cell from a higher SoC cell directly and thus efficiently.

By now it should be appreciated that there has been provided a method of operating a battery system comprising a plurality of battery cells coupled in series, wherein the plurality of cells includes at least three battery cells coupled in series. The method includes determining a cell with the greatest charge excess of the plurality of battery cells. The method includes determining a cell with the greatest charge deficit of the plurality of battery cells. The method includes discharging the cell with the greatest charge excess to charge, with a voltage converter, the cell with the greatest charge deficit. The method may have a further characterization by which the voltage converter is a characterized as a SEPIC voltage converter. The method may further comprise a plurality of converter stages, wherein each converter stage of the plurality is associated with a cell of the plurality of battery cells, wherein the discharging includes using a converter stage associated with the cell with the greatest charge excess as a source stage of the voltage converter and a converter stage associated with the cell with the greatest charge deficit as a sink stage of the voltage converter. The method may further comprise after the discharging, determining a second cell with the greatest charge deficit of the plurality of battery cells and discharging after the determining a second cell, the cell with the greatest charge excess to charge, with a voltage converter, the second cell, wherein the discharging after the determining a second cell includes using the converter stage associated with the cell with the greatest charge excess as a source stage of the voltage converter and a converter stage associated with the second cell as a sink stage of the voltage converter. The method may have a further characterization by which during the discharging the cell, the converter stage associated with the second cell is configured in a passive configuration; and during the discharging after the determining, the converter stage used as a sink stage for the discharging is configured in a passive configuration. The method may further comprise after the discharging, determining a second cell with the greatest charge excess of the plurality of battery cells and discharging after the determining a second cell, the second cell to charge, with a voltage converter, the cell with the greatest charge deficit, wherein the discharging after the determining a second cell includes using a converter stage of the second cell as a source stage of the voltage converter and the converter stage of the cell associated with the greatest charge deficit as the sink stage of the voltage converter. The method may further comprise after the discharging, performing a determining operation, wherein the performing includes determining a cell with the greatest charge deficit of the plurality of battery cells and determining a cell with the greatest charge excess of the plurality of battery cells and discharging the cell with the greatest charge excess as determined by the performing, to charge, with a voltage converter, the cell with the greatest charge deficit as determined by the performing. The method may have a further characterization by which the discharging occurs during a charging operation of the plurality of battery cells. The method may have a further characterization by which. The method may have a further characterization by which the discharging occurs during the plurality of battery cells providing power to a load.

Also disclosed is a circuit for controlling an operation of a plurality of battery cells coupled in series, wherein the plurality of battery cells includes at least three cells. The circuit includes a bus. The circuit includes a plurality of converter stages each coupled to the bus, wherein each stage of the plurality of converter stages is associated with a cell of the plurality of battery cells, wherein each stage of the plurality of converter stages is configurable to serve as a source stage of a voltage converter for discharging the cell associated with the source stage to charge, via the bus, another cell of the plurality of battery cells, and wherein each stage of the plurality of converter stages is configurable to serve as a sink stage for a voltage converter for charging the cell of the plurality of battery cells associated with the sinkd stage from another cell of the plurality of battery cells via the bus. The circuit includes control circuitry for controlling the configuration of the plurality of converter stages. The circuit may have a further characterization by which each stage of the plurality of converter stages is configurable as a source stage for a single ended primary inductor converter (SEPIC) and each stage of the plurality of converter stages is configurable as a sink stage for a single ended primary inductor converter (SEPIC). The circuit may have a further characterization by which each stage of the plurality of converter stages includes an inductor, a switch, and a capacitor. The circuit may have a further characterization by which the capacitor of each stage of the plurality of converter stages is connected to the bus. The circuit may have a further characterization by which each converter stage of the plurality of converter stages includes an inductor, wherein when the each converter stage is configured as a source stage of a voltage converter, a first terminal of the inductor is connected to a positive terminal of a cell associated with the each converter stage, wherein when the each converter stage is configured as a sink stage of a voltage converter, the first terminal of the inductor is connected to a negative terminal of the cell associated with the each converter stage. The circuit may have a further characterization by which when the each converter stage is configured in a passive configuration, the first terminal of the inductor is not connected to either the positive terminal or the negative terminal of the cell associated with the each converter stage. The circuit may have a further characterization by which each stage of the plurality of converter stages comprises a switch having a first terminal connected to a second terminal of the inductor of each stage, the switch has a second terminal connected to the negative terminal of the cell associated with the each converter stage, wherein when the stage that is configured as a source stage of a voltage converter, the control circuitry provides a pulse width modulated signal to control the conductivity of the switch of the stage. The circuit may have a further characterization by which during an equalization operation, a controller configures a converter stage of the plurality of converter stages associated with a cell of the plurality of battery cells determined to have the greatest charge excess as a source stage of a voltage converter and configures a converter stage of the plurality of converter stages associated with a cell of the plurality of battery cells determined to have the greatest charge deficit as a sink stage of the voltage converter to provide charge for charging the cell determined to have the greatest charge deficit. The circuit may have a further characterization by which during an equalization operation, the controller configures no more than one converter stage of the plurality of converter stages as a source stage and no more than one converter stage of the plurality of converter stages as a sink stage.

Also described is a circuit for controlling an operation of a plurality of battery cells coupled in series. The circuit includes sensor circuitry for determining the state of charge of each cell of the plurality of battery cells. The circuit includes a first converter stage. The circuit includes a second converter stage, the second converter stage coupled to the first converter stage by at least one capacitor. The circuit includes control circuitry, wherein during a cell equalization operation, the control circuitry provides control signals to enable the first stage to be a source stage of a single ended primary inductor converter (SEPIC) converter and the second stage to be a sink stage for the SEPIC converter for discharging a first cell of the plurality of battery cells to transfer charge to a second cell of the plurality of battery cells to charge the second cell. The circuit has a further characterization by which the first converter stage includes a first inductor and the second converter stage includes a second inductor, the first inductor and the second inductor are coupled by the at least one capacitor.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention has been described with respect to specific conductivity types or polarity of potentials, skilled artisans appreciated that conductivity types and polarities of potentials may be reversed.

Although the invention is described herein with reference to specific embodiments, various modifications and changes can be made without departing from the scope of the present invention as set forth in the claims below. For example, the switches may be preferably implemented using MOS transistors but other switches may be used. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method of operating a battery system comprising a plurality of battery cells coupled in series and a plurality of converter stages, wherein the plurality of battery cells includes at least three battery cells coupled in series and each converter stage of the plurality of converter stages is associated with a cell of the plurality of battery cells, the method comprising:
   determining a cell with a greatest charge excess of the plurality of battery cells;
   determining a cell with a greatest charge deficit of the plurality of battery cells;
   discharging the cell with the greatest charge excess in order to charge, with a voltage converter, the cell with the greatest charge deficit, wherein the discharging comprises
      using a converter stage associated with the cell with the greatest charge excess as a source stage of the voltage converter, and
      using a converter stage associated with the cell with the greatest charge deficit as a sink stage of the voltage converter.

2. The method of claim 1 wherein the voltage converter is characterized as a SEPIC voltage converter.

3. The method of claim 1 further comprising:
   after the discharging, determining a second cell with the greatest charge deficit of the plurality of battery cells; and
   after the determining the second cell, discharging the cell with the greatest charge excess in order to charge, with a voltage converter, the second cell, wherein the discharging after the determining the second cell comprises
      using the converter stage associated with the cell with the greatest charge excess as a source stage of the voltage converter, and
      using a converter stage associated with the second cell as a sink stage of the voltage converter.

4. The method of claim 3 wherein:
   during the discharging the cell, configuring the converter stage associated with the second cell in a passive configuration; and
   during the discharging after determining the second cell, configuring the converter stage used as a sink stage for the discharging in a passive configuration.

5. The method of claim 1 further comprising:
   after the discharging, determining a second cell with the greatest charge excess of the plurality of battery cells; and after the determining the second cell, discharging the second cell in order to charge, with a voltage converter, the cell with the greatest charge deficit, wherein the discharging the second cell comprises using a converter stage of the second cell as a source stage of the voltage converter, and using the converter stage of the cell associated with the greatest charge deficit as the sink stage of the voltage converter.

6. The method of claim 1 further comprising:

after the discharging, determining a second cell with the greatest charge deficit of the plurality of battery cells and determining a third cell with the greatest charge excess of the plurality of battery cells; and discharging the third cell, in order to charge, with a voltage converter, the second cell.

7. The method of claim 1 wherein the discharging occurs during a charging operation of the plurality of battery cells.

8. The method of claim 1 wherein the discharging occurs during the plurality of battery cells providing power to a load.

9. A circuit for controlling an operation of a plurality of battery cells coupled in series, wherein the plurality of battery cells includes at least three cells, the circuit comprising:

sensor circuitry for determining a state of charge of each cell of the plurality of battery cells;

a bus;

a plurality of converter stages each coupled to the bus, wherein each stage of the plurality of converter stages is associated with a cell of the plurality of battery cells, each stage of the plurality of converter stages comprises an inductor, a switch, and a capacitor, each stage of the plurality of converter stages is configurable to serve as a source stage of a voltage converter for discharging the cell associated with the source stage in order to charge, via the bus, another cell of the plurality of battery cells, and each stage of the plurality of converter stages is configurable to serve as a sink stage for a voltage converter for charging the cell of the plurality of battery cells associated with the sink stage from another cell of the plurality of battery cells via the bus; and control circuitry for controlling the configuration of the plurality of converter stages.

10. The circuit of claim 9 wherein each stage of the plurality of converter stages is configurable as a source stage for a single ended primary inductor converter (SEPIC) and each stage of the plurality of converter stages is configurable as a sink stage for a single ended primary inductor converter (SEPIC).

11. The circuit of claim 9 wherein the capacitor of each stage of the plurality of converter stages is connected to the bus.

12. The circuit of claim 9, wherein when the each converter stage is configured as a source stage of a voltage converter, a first terminal of the inductor is connected to a positive terminal of a cell associated with the each converter stage, and when the each converter stage is configured as a sink stage of a voltage converter, the first terminal of the inductor is connected to a negative terminal of the cell associated with the each converter stage.

13. The circuit of claim 12 wherein when the each converter stage is configured in a passive configuration, the first terminal of the inductor is not connected to either the positive terminal or the negative terminal of the cell associated with the each converter stage.

14. The circuit of claim 12, wherein the switch of each stage of the plurality of converter stages has a first terminal connected to a second terminal of the inductor of each stage, the switch has a second terminal connected to the negative terminal of the cell associated with the each converter stage, and when the stage that is configured as a source stage of a voltage converter, the control circuitry provides a pulse width modulated signal to control the conductivity of the switch of the stage.

15. The circuit of claim 9 wherein during an equalization operation, the control circuitry configures a converter stage of the plurality of converter stages associated with a cell of the plurality of battery cells determined to have a greatest charge excess as a source stage of a voltage converter, and a converter stage of the plurality of converter stages associated with a cell of the plurality of battery cells determined to have a greatest charge deficit as a sink stage of the voltage converter in order to provide charge for charging the cell determined to have the greatest charge deficit.

16. The circuit of claim 9 wherein during an equalization operation, the control circuitry configures no more than one converter stage of the plurality of converter stages as a source stage and no more than one converter stage of the plurality of converter stages as a sink stage.

* * * * *